US008443858B2

(12) United States Patent
Lin

(10) Patent No.: US 8,443,858 B2
(45) Date of Patent: May 21, 2013

(54) EDGE BANDING MACHINE

(76) Inventor: Chin-Chi Lin, Taichung (TW)

( * ) Notice: Subject to any disclaimer, the term of this patent is extended or adjusted under 35 U.S.C. 154(b) by 301 days.

(21) Appl. No.: 13/071,283

(22) Filed: Mar. 24, 2011

(65) Prior Publication Data

US 2012/0186515 A1 Jul. 26, 2012

(51) Int. Cl.
*B32B 37/12* (2006.01)

(52) U.S. Cl.
USPC ............. 156/459; 156/443; 156/468; 53/203; 53/430; 118/244; 118/246; 118/252

(58) Field of Classification Search
USPC ..... 156/443, 459, 468; 53/203, 430; 118/244, 118/246, 252
See application file for complete search history.

(56) References Cited

U.S. PATENT DOCUMENTS 6,263,938 B1 * 7/2001 Maioli et al. .................. 156/447

FOREIGN PATENT DOCUMENTS

WO WO 2006076871 A1 * 7/2006

* cited by examiner

*Primary Examiner* — George Koch
(74) *Attorney, Agent, or Firm* — Christensen O'Connor Johnson Kindness PLLC

(57) ABSTRACT

An edge banding machine has: a glue-applying unit including a glue container mounted on a mounting plate, and a glue-applying roller rotatable relative to the glue container; a transmission unit including front and rear conveying wheels and a transmission member connected between the front and rear conveying wheels for driving the glue-applying roller; and a feeding unit including two juxtaposed vertical rods disposed on the mounting plate and spaced apart from each other by a passage distance, and two elongate projecting blocks spaced apart from each other by a distance that reduces gradually in a direction toward the front conveying wheel. The projecting blocks are spaced apart from the vertical rods by a gap distance. A ratio of the gap distance to the passage distance is not more than 4.

6 Claims, 7 Drawing Sheets

EDGE BANDING MACHINE

BACKGROUND OF THE INVENTION

1. Field of the Invention

The invention relates to an edge banding machine, more particularly to an edge banding machine that is convenient for an edge band to be fed in.

2. Description of the Related Art

At present, there is a typical edge banding machine, as disclosed in International Patent Publication Number WO2006076871, which includes a glue-applying unit, a transmission unit and a feeding unit. The glue-applying unit has a glue container, and a glue-applying roller that is rotatable relative to the glue container. The transmission unit has a front conveying wheel and a rear conveying wheel disposed respectively at two sides of the glue-applying roller, and a belt connected between the front and rear conveying wheels for driving the glue-applying roller. The feeding unit is disposed in front of the front conveying wheel, and is formed with a pair of outer holes allowing for insertion of a pair of outer guiding rods, and with a pair of inner holes allowing for insertion of a pair of inner guiding rods.

In use, an edge band is guided to pass through the feeding unit, so that it is moved by the front conveying wheel to pass past the glue-applying roller such that the glue smeared on the glue-applying roller is applied to one of two opposite side surfaces of the edge band, after which, the rear conveying wheel moves the edge band out of the edge banding machine and adheres the edge band to a workpiece (such as a furniture) that is adjacent to the rear conveying wheel. In such a manner, an edge banding operation is completed.

However, since the edge band is bendable and usually is rolled up, extra effort and time are needed by an operator to align the edge band with a gap between the outer guiding rods for accurate insertion. Nevertheless, since the distance of the outer guiding rods is relatively small, and since the distance between the inner guiding rods and the outer guiding rods is relatively large, the alignment operation of the inner guiding rods appears to be rather complicated. As such, the entire alignment operation highly needs improvement.

SUMMARY OF THE INVENTION

Therefore, the main object of the present invention is to provide an edge banding machine that is convenient for an edge band to be fed in.

Accordingly, an edge banding machine of the present invention comprises a machine body unit, a glue-applying unit, a transmission unit and a feeding unit.

The machine body unit includes a mounting plate. The glue-applying unit includes a glue container mounted on the mounting plate, and a glue-applying roller extending into the glue container and rotatable relative to the glue container. The transmission unit includes a pair of front and rear conveying wheels disposed pivotally on the mounting plate and located respectively to two opposite sides of the glue-applying roller, a transmission member connected between and driven by the front and rear conveying wheels to rotate the glue-applying roller, and a motor operable for driving the front and rear conveying wheels to rotate, wherein the front conveying wheel is disposed in front of the rear conveying wheel. The feeding unit includes two juxtaposed vertical rods disposed on the mounting plate and in front of the front conveying wheel and spaced apart from each other in a left-to-right direction by a passage distance, and two elongate projecting blocks disposed respectively in front of the vertical rods and spaced apart from each other by a distance that reduces gradually in a direction toward the front conveying wheel. Each of the projecting blocks has a proximate end proximate to and spaced apart from a corresponding one of the vertical rods by a gap distance, and a distal end opposite to and spaced apart from the proximate end along the front-to-rear direction by a length distance, wherein a ratio of the gap distance to the passage distance is not more than 4, and a ratio of the length distance to the passage distance is not less than 5.

The effect of this invention is: through the guidance of the projecting blocks, the edge band can pass easily through the feeding unit for subsequent conveyance by the front conveying wheel, and in such a manner, the edge band is easily fed into the edge banding machine.

BRIEF DESCRIPTION OF THE DRAWINGS

Other features and advantages of the present invention will become apparent in the following detailed description of a preferred embodiment with reference to the accompanying drawings, of which.

DETAILED DESCRIPTION OF THE PREFERRED EMBODIMENT

Figure 1:
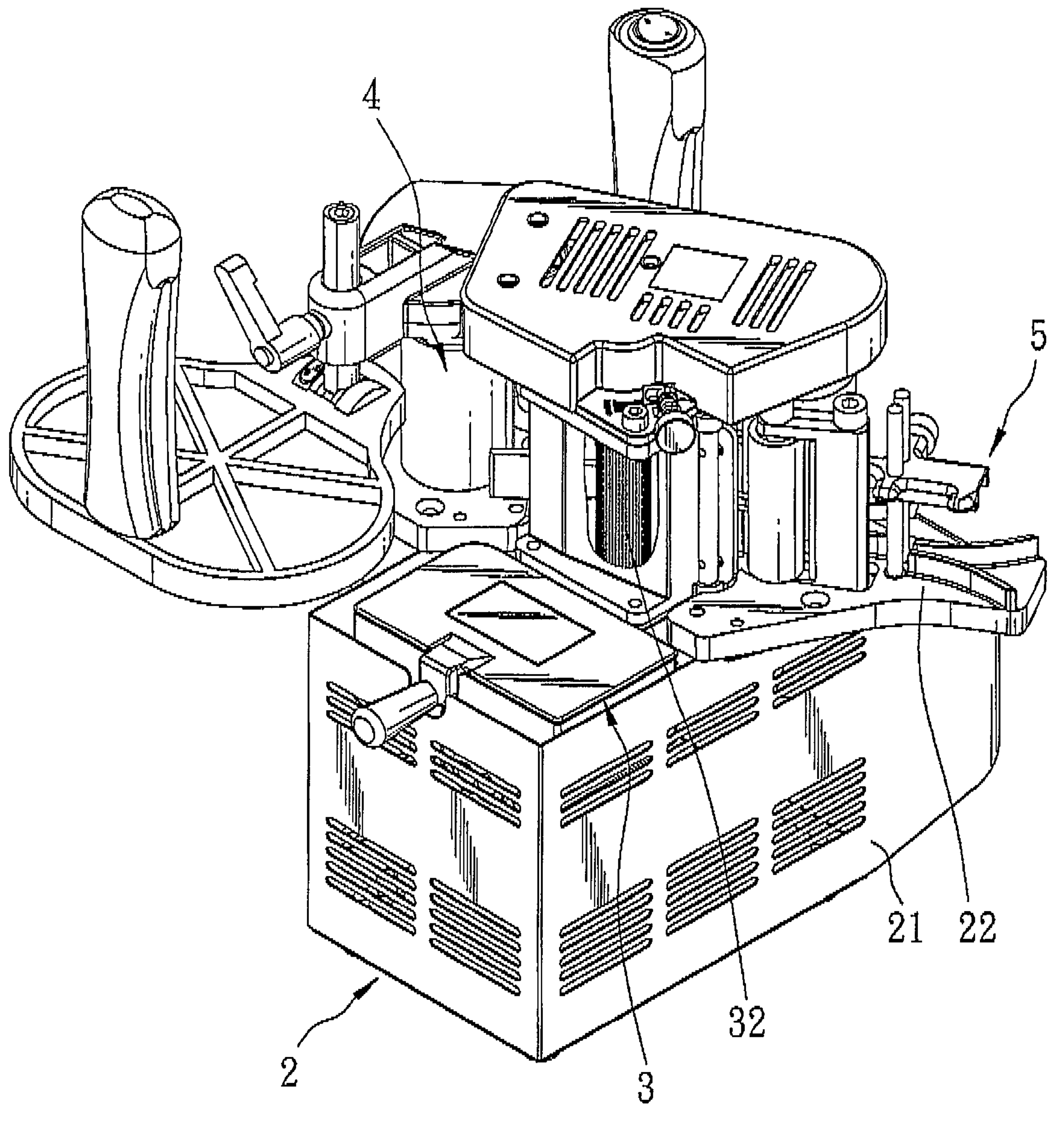
FIG. 1 is an assembled perspective view of the preferred embodiment of an edge banding machine according to the present invention.
Figure 2:
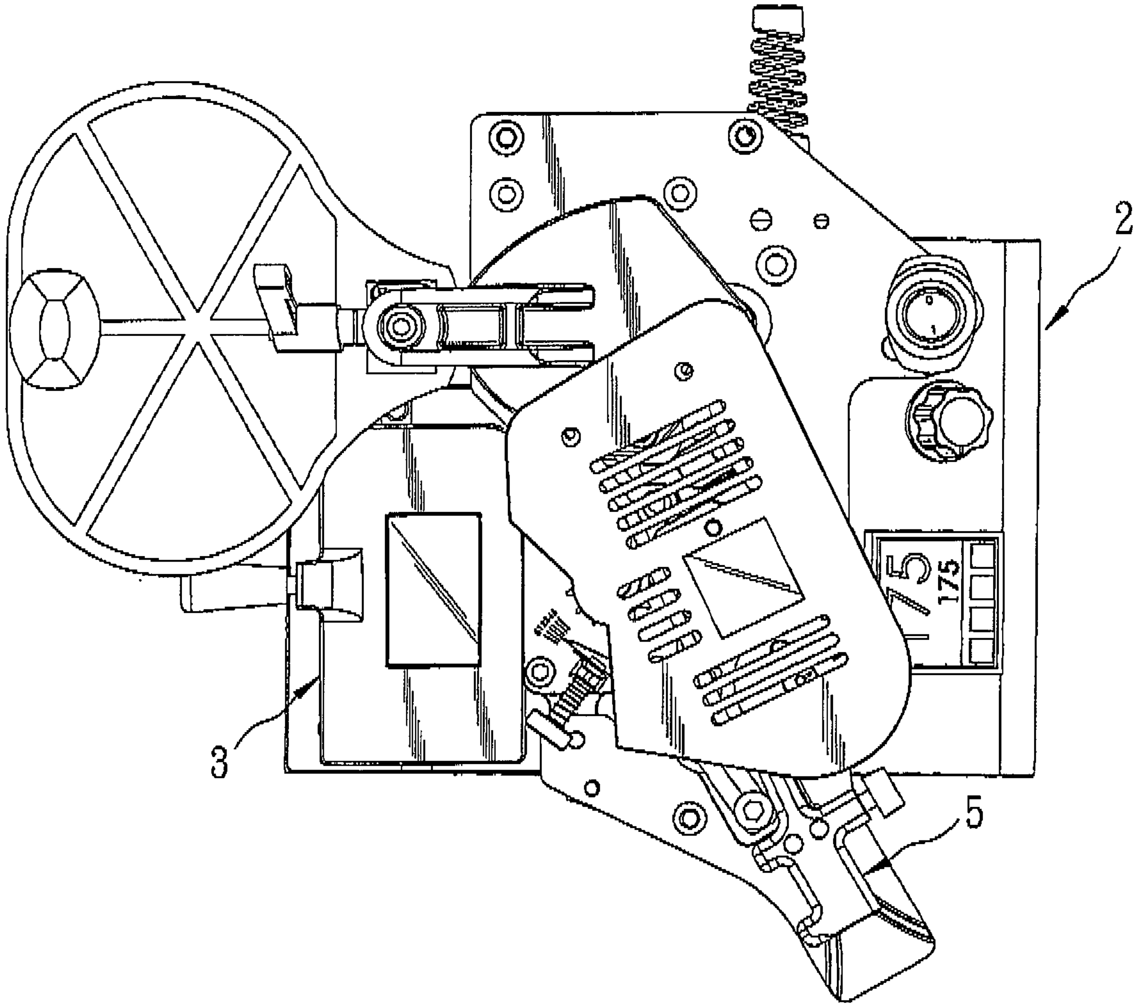
FIG. 2 is a top view of the preferred embodiment.
Figure 3:
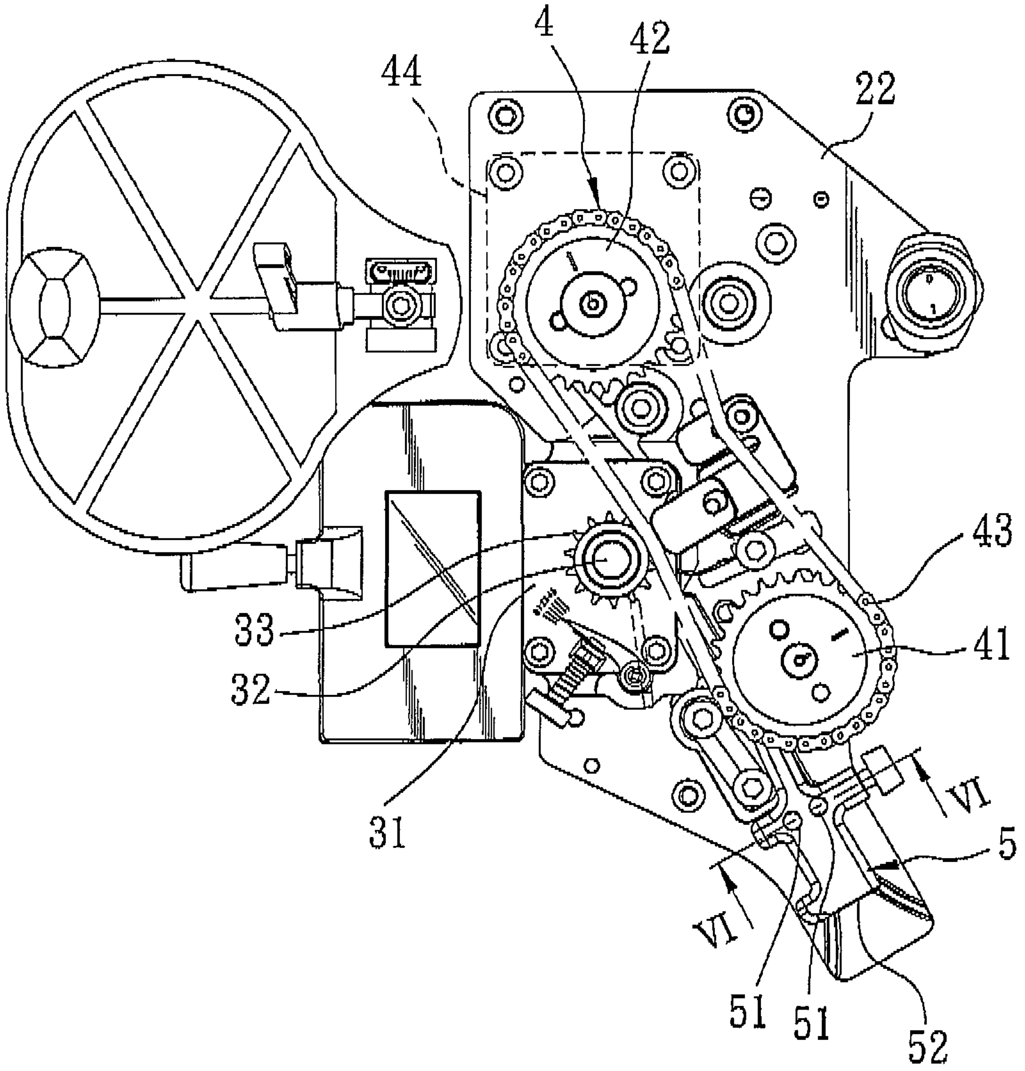
FIG. 3 is a fragmentary top view of the preferred embodiment.

Referring to FIGS. 1 to 3, the preferred embodiment of en edge banding machine according to the present invention is shown to have a machine body unit 2, a glue-applying unit 3, a transmission unit 4 and a feeding unit 5.

The machine body unit 2 includes a machine housing 21 and a mounting plate 22 mounted on the machine housing 21.

The glue-applying unit 3 includes a glue container 31 mounted on the mounting plate 22, and a glue-applying roller 32 extending into the glue container 31 and rotatable relative to the glue container 31.

The transmission unit 4 includes a pair of front and rear conveying wheels 41, 42, disposed pivotally on the mounting plate 22 and located respectively to two opposite sides of the glue-applying roller 32, a transmission member 43 connected between and driven by the front and rear conveying wheels 41, 42 to rotate the glue-applying roller 32, and a motor 44 operable for driving the front and rear conveying wheels 41, 42 to rotate. The front conveying wheel 41 is disposed in front of the rear conveying wheel 42. In this embodiment, the motor 44 is disposed beneath the mounting plate 22 for driving the rear conveying wheel 42, each of the front and rear conveying wheels 41, 42 has a sprocket, and the transmission member 43 is a chain that is connected between the front conveying wheel 41 and the rear conveying wheel 42, and has an outer side engaging a sprocket 33 connected coaxially and fixedly to the glue-applying roller 32.

Figure 5:
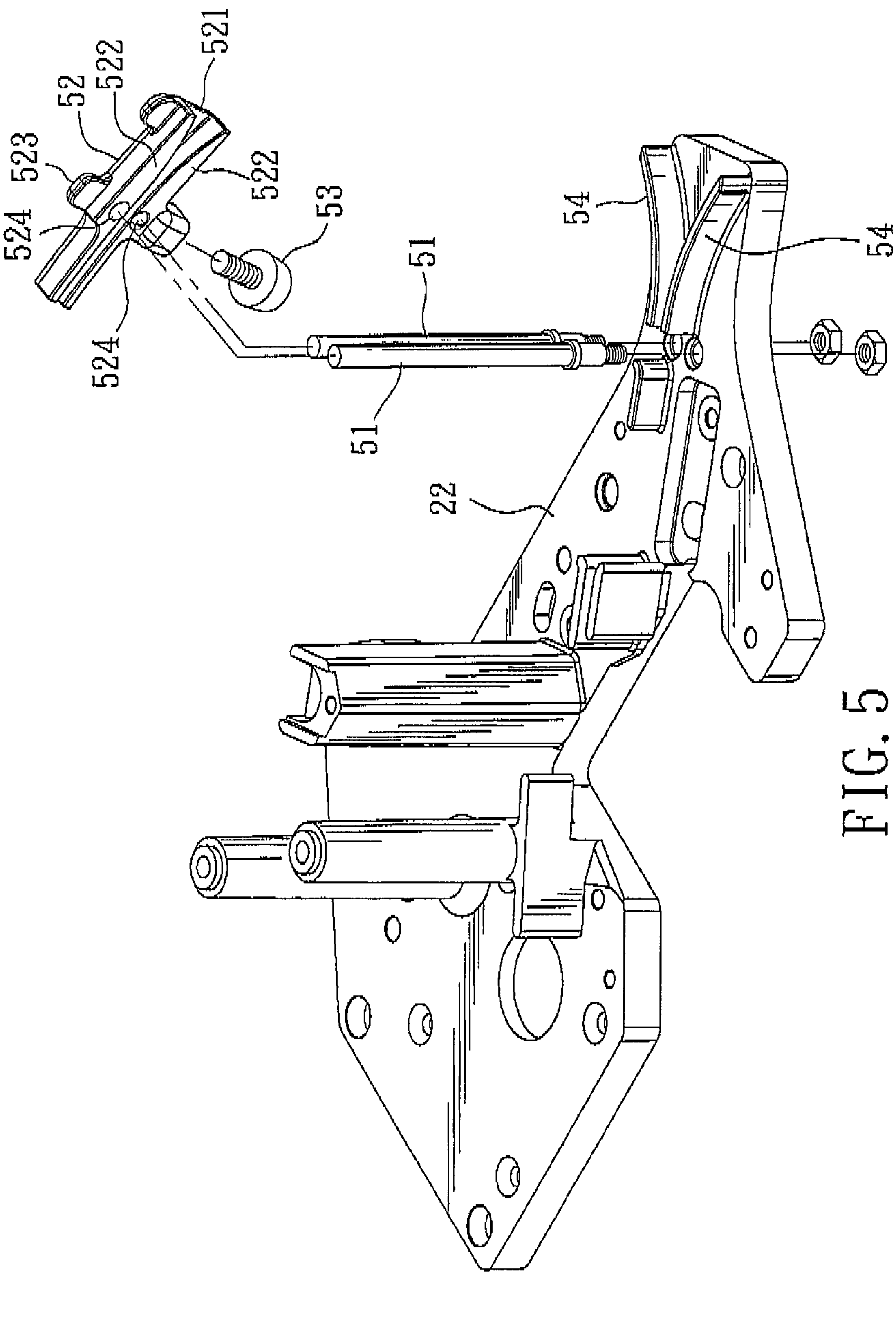
FIG. 5 is a partly exploded perspective view of the mounting plate and the feeding unit of the preferred embodiment.

With further referent to FIG. 5, the feeding unit 5 includes two juxtaposed vertical rods 51 disposed on the mounting plate 22 and in front of the front conveying wheel 41, an adjusting member 52 sleeved movably on the vertical rods 51, a lock bolt 53 for locking the adjusting member 52 on the vertical rods 51, and two elongate projecting blocks 54 disposed on the mounting plate 22, located respectively in front of the vertical rods 51, and spaced apart from each other by a distance that reduces gradually in a direction toward the front conveying wheel 41.

Figure 6:
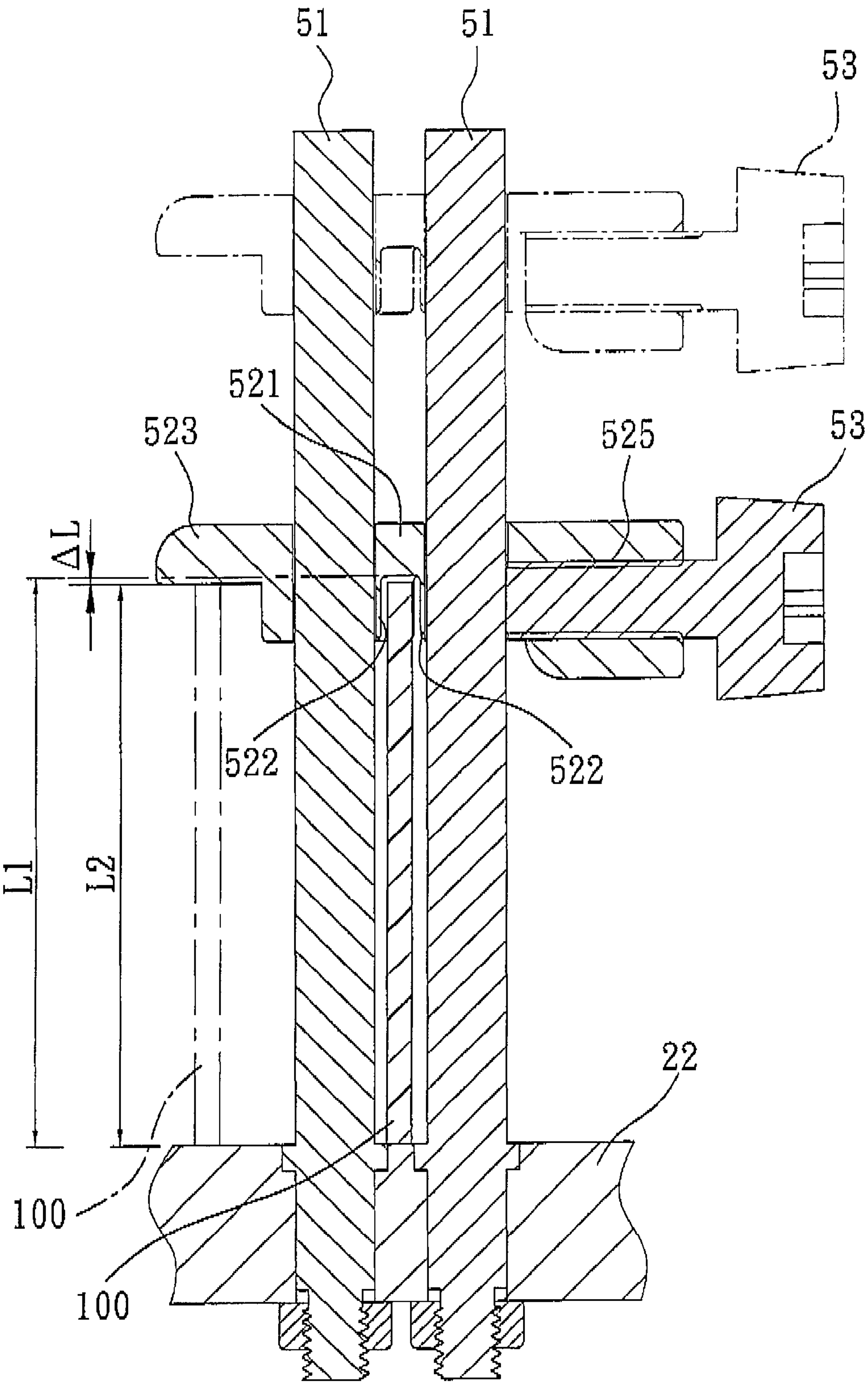
FIG. 6 is a sectional view taken along line VI-VI in FIG. 3.

With particular reference to FIGS. 3, 5, and 6, the adjusting member 52 includes a main body 521 aligned with the mounting plate 22, two elongate guiding portions 522 extending from the main body 521 toward the mounting plate 22 and aligned respectively with the projecting blocks 54, and a calibration portion 523 extending from the main body 521 away from the vertical rods 51 in the left-to-right direction. The adjusting member 52 further includes two through holes 524, each extending though the main body 521 and a respective one of the guiding portions 522, and a threaded hole 525 formed in the main body 521 and in spatial communication with one of the through holes 524 so that the vertical rods 51 extends respectively through the through holes 524, and the lock bolt 53 engages the threaded hole 525 and presses against one of the vertical rods 51 extending through the one of the through holes 524.

In this embodiment, the distance (L1) between the main body 521 and the mounting plate 22 is larger than the distance (L2) between the calibration portion 523 and the mounting plate 22 by a distance increment (ΔL). Preferably, the distance increment (ΔL) is not larger than 2 mm.

The guiding portions 522 are spaced apart from each other by a distance that reduces gradually in a direction toward the front conveying wheel 41.

Figure 7:
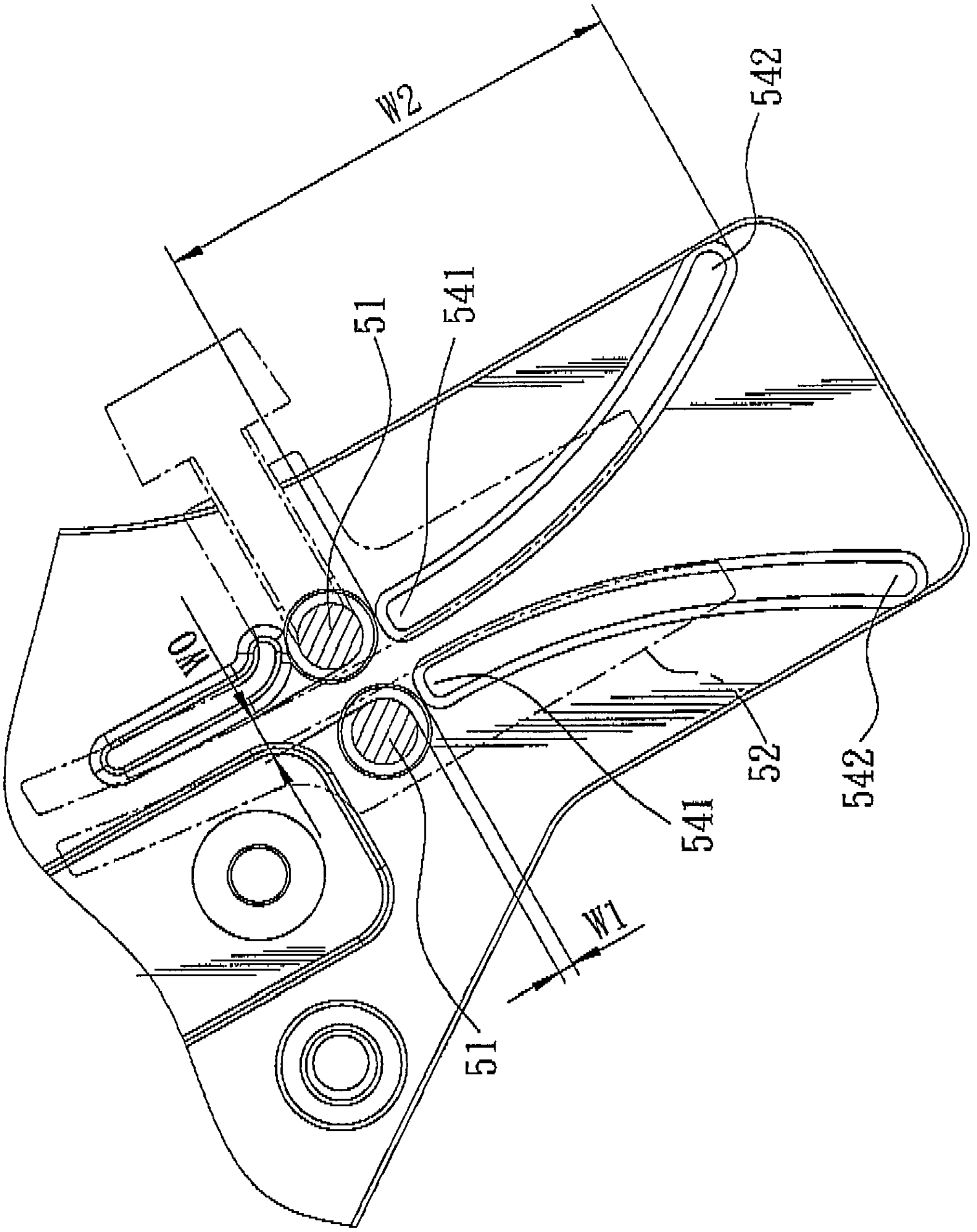
FIG. 7 is a fragmentary sectional view of the preferred embodiment.

With particular reference to FIGS. 5 and 7, each of the projecting blocks 54 has a proximate end 541 proximate to and spaced apart from a corresponding one of the vertical rods 51 by a gap distance (W1), and a distal end 542 opposite to and spaced apart from the proximate end 541 along the front-to-rear direction by a length distance (W2), wherein a ratio of the gap distance (W1) to a passage distance (W0) between the vertical rods 51 is not more than 4, and a ratio of the length distance (W2) to the passage distance (W0) is not less than 5. Preferably, the gap distance (W1) ranges between 0.2 and 2 mm, the ratio of the gap distance (W1) to the passage distance (W0) ranges between 0.2 and 1.0, and the ratio of the length distance to the passage distance (W0) ranges between 8 and 12.

Before an edge banding operation, as shown by the phantom lines in FIG. 6, the lock bolt 53 is first loosened. Next, the height of the adjusting member 52 is adjusted such that top and bottom sides of an edge band 100 (shown by the phantom lines in FIG. 6) abut against, calibration portion 523 and the mounting plate 22, respectively. Afterwards, the lock bolt 53 is tightened so as to fix the position of the adjusting member 52.

Figure 4:
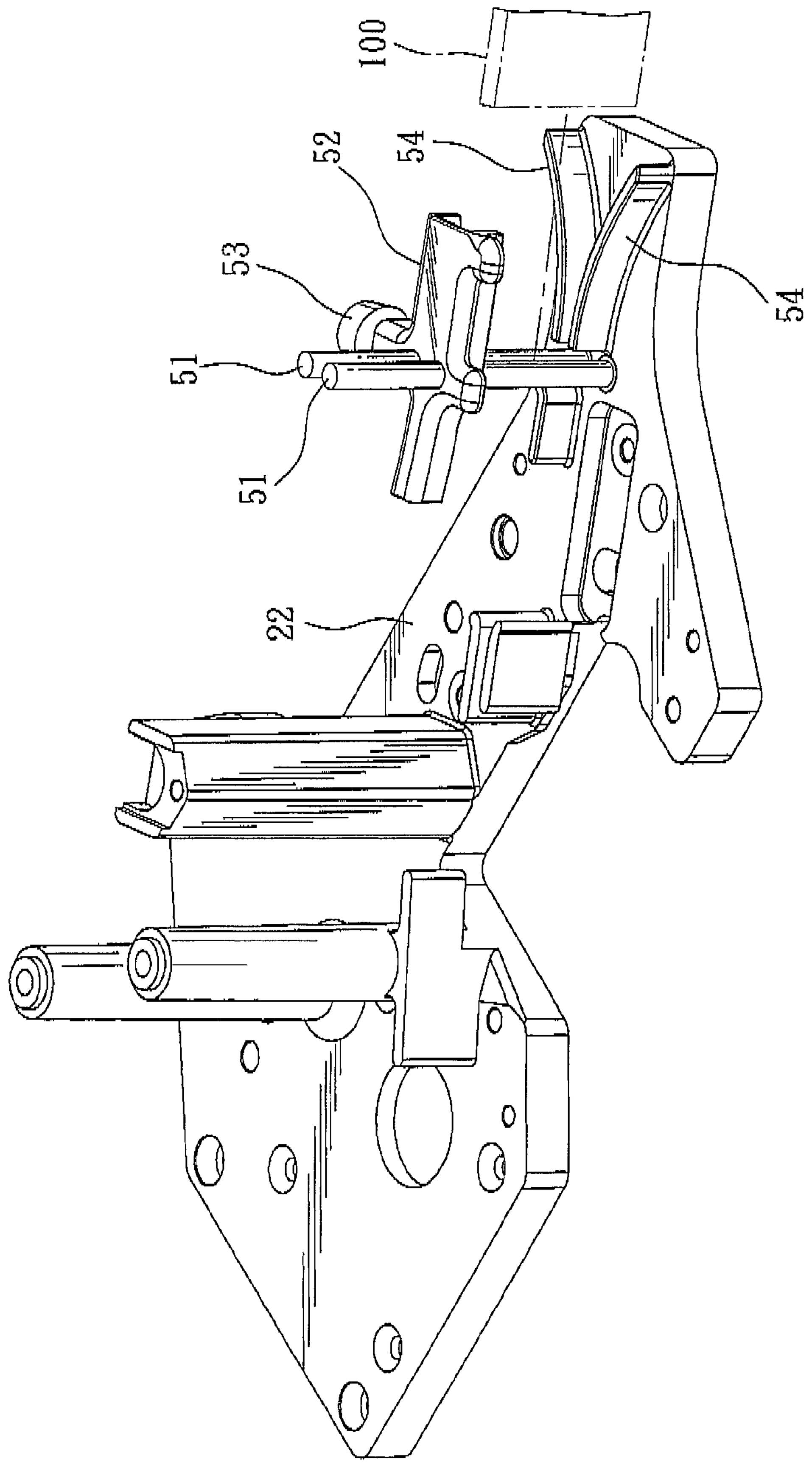
FIG. 4 is an assembled perspective view of a mounting plate and a feeding unit of the preferred embodiment.

Referring back to FIGS. 3, 4 and 6, at this time, the edge band 100 can be extended into the feeding unit 5 for edge banding operation. Since the gaps formed by the projecting blocks 54 and the guiding portions 522 are large, and since the distance (L1) is larger than the distance (L2) by the distance increment (ΔL), the edge band 100 can be guided by the projecting blocks 54 and the guiding portions 522 to move forward smoothly, and can be moved by the front conveying wheel 41. Hence, one of two opposite side surfaces of the edge band 100 comes into contact with the glue-applying roller 32 to be applied with glue from the glue-applying roller 32. Thereafter, through operation of the rear conveying wheel 42, the edge band 100 is moved out of the edge banding machine, and is adhered to a workpiece (not shown) that is adjacent to the rear conveying wheel 42.

From the foregoing, as compared to the above-mentioned conventional edge banding machine, when the edge band 100 is fed in, the edge banding machine of this invention has a longer guiding distance (i.e., W2) formed by the projecting blocks 54, and a shorter distance (i.e., W1) between the projecting blocks 54 and the vertical rods 51, so that the edge band 100 can be fed in with ease, thus shortening the feeding-in time. In sum, the object of this invention is achieved.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. An edge banding machine comprising:

a machine body unit including a mounting plate;

a glue-applying unit including a glue container mounted on said mounting plate, and a glue-applying roller extending into said glue container and rotatable relative to said glue container;

a transmission unit including a pair of front and rear conveying wheels disposed pivotally on said mounting plate and located respectively to two opposite sides of said glue-applying roller, a transmission member connected between and driven by said front and rear conveying wheels to rotate said glue-applying roller, and a motor operable for driving said front and rear conveying wheels to rotate, said front conveying wheel being disposed in front of said rear conveying wheel; and a feeding unit including two juxtaposed vertical rods disposed on said mounting plate and in front of said front conveying wheel and spaced apart from each other in a left-to-right direction by a passage distance, and two elongate projecting blocks disposed on said mounting plate, located respectively in front of said vertical rods, and spaced apart from each other by a distance that reduces gradually in a direction toward said front conveying wheel, each of said projecting blocks having a proximate end proximate to and spaced apart from a corresponding one of said vertical rods by a gap distance, and a distal end opposite to and spaced apart from said proximate end along the front-to-rear direction by a length distance, a ratio of the gap distance to the passage distance being not more than 4, a ratio of the length distance to the passage distance being not less than 5.

2. The edge banding machine as claimed in claim 1, wherein the gap distance ranges between 0.2 and 2 mm, the ratio of the gap distance to the passage distance ranges between 0.2 and 1.0, and the ratio of the length distance to the passage distance ranges between 8 and 12.

3. The edge banding machine as claimed in claim 1, wherein said feeding unit further includes an adjusting member sleeved movably on said vertical rods, and a lock bolt for locking said adjusting member on said vertical rods, said adjusting member including a main body aligned with said mounting plate, two elongate guiding portions extending from said main body toward said mounting plate and aligned respectively with said projecting blocks, said guiding portions being spaced apart from each other by a distance that reduces gradually in a direction toward said front conveying wheel.

4. The edge banding machine as claimed in claim 3, wherein said feeding unit further includes a calibration portion extending from said main body away from said vertical rods in the left-to-right direction, a distance between said main body and said mounting plate being greater than that between said calibration portion and said mounting plate by a distance increment.

5. The edge banding machine as claimed in claim 4, wherein said distance increment is not more than 2 mm.

6. The edge banding machine as claimed in claim 3, wherein said adjusting member further includes two through holes each extending though said main body and a respective one of said guiding portions, and a threaded hole formed in said main body and in spatial communication with one of said through holes, said vertical rods extending respectively through said through holes, said lock bolt engaging said threaded hole and pressing against one of said vertical rods extending through the one of said through holes.

* * * * *